United States Patent [19]

Sokolik et al.

[11] Patent Number: 4,646,175

[45] Date of Patent: Feb. 24, 1987

[54] METHOD AND APPARATUS FOR POSITIONING TRANSDUCERS BY DIGITAL CONVERSION OF ANALOG-TYPE SIGNALS

[75] Inventors: Edmund L. Sokolik, Warren; Francis Lum, Ann Arbor, both of Mich.

[73] Assignee: Irwin Magnetic Systems, Inc., Ann Arbor, Mich.

[21] Appl. No.: 597,012

[22] Filed: Apr. 5, 1984

[51] Int. Cl.$^4$ .................. G11B 21/08; G11B 21/10
[52] U.S. Cl. ............................................ 360/78; 360/77
[58] Field of Search ............... 360/77, 78, 44, 75; 369/32, 33; 318/561, 571

[56] References Cited

U.S. PATENT DOCUMENTS

| | | | |
|---|---|---|---|
| 4,032,915 | 6/1977 | Shanks et al. | 360/44 |
| 4,052,741 | 10/1977 | Baca et al. | 360/77 |
| 4,157,577 | 6/1979 | Porter, Jr. et al. | 360/77 |
| 4,297,737 | 10/1981 | Andresen et al. | 360/77 X |
| 4,396,959 | 8/1983 | Harrison et al. | 360/77 |
| 4,454,549 | 6/1984 | Pennington | 360/77 |
| 4,462,053 | 7/1984 | Lum et al. | 360/78 |
| 4,472,750 | 9/1984 | Klumpp et al. | 360/78 |

OTHER PUBLICATIONS

IBM TDB, vol. 22, No. 6, "Digital Sector Servo System" Pennington et al., 11/79, pp. 2476-2481.
IBM TDB, vol. 19, No. 4, "Head-to-Track Synchronizing Mechanism for Magnetic Disks" Porter et al., 9/76, pp. 1393-1395.
EDN, vol. 23, No. 9, "Standard 3M Recording Techniques Could Spur Low Cost $\mu$C Use" Kramer, 5/78, pp. 75-81.

Primary Examiner—Raymond F. Cardillo
Assistant Examiner—Steven R. Garland
Attorney, Agent, or Firm—Price, Heneveld, Cooper, DeWitt & Litton

[57] ABSTRACT

Apparatus and method for decoding of transducer head-positioning information which has been recorded on data-storage media, in particular magnetic tape, and for use of the decoded information to position a transducer head, wherein the transducer head reads the recorded information and its output signals are sampled at predetermined times to determine their magnitude and a digital representation of such magnitude is obtained by timing an interval during which a reference source increases at a known rate from a first value to a second value whose difference corresponds to the detected magnitude of the transducer output signals. The timed interval is outputted in the form of a digital count value which is thus representative of the head-positioning information read out from the data storage media, and the digital signal provided by such count value is then used in positioning, or repositioning, the transducer head in a representative manner.

29 Claims, 5 Drawing Figures

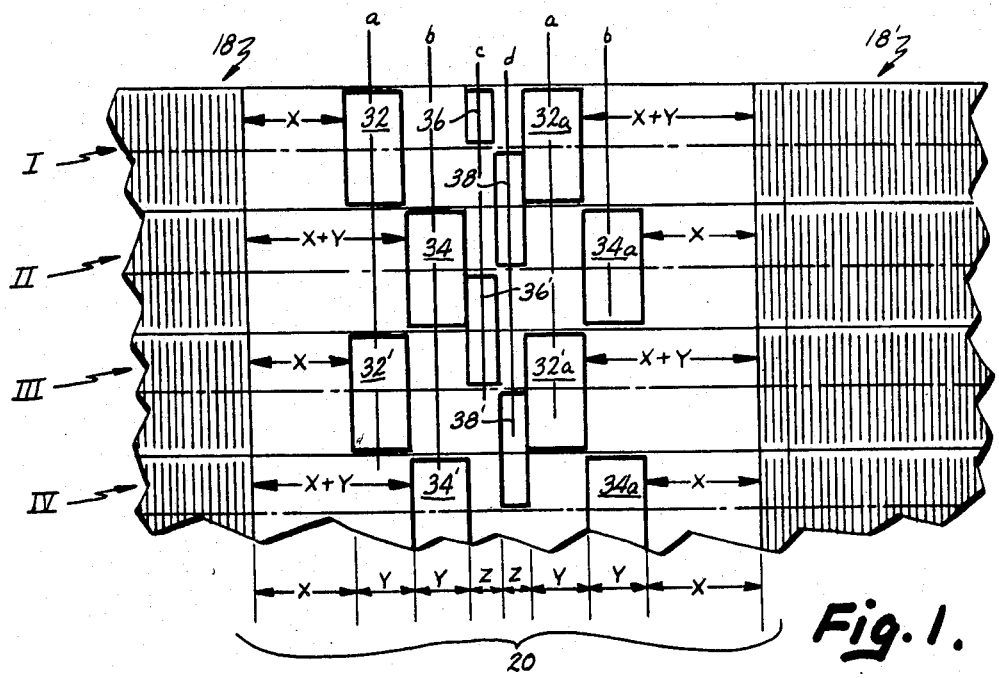
Fig. 1.
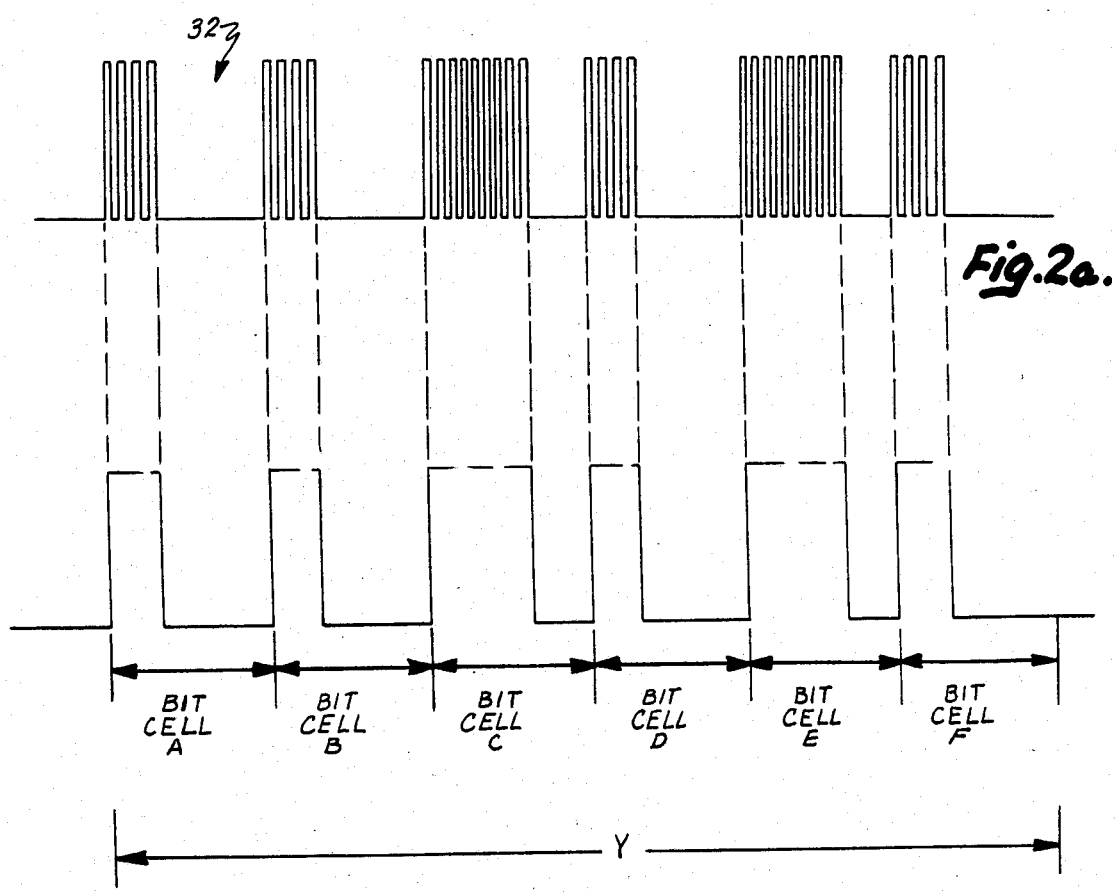
Fig. 2a.
Fig. 2b.

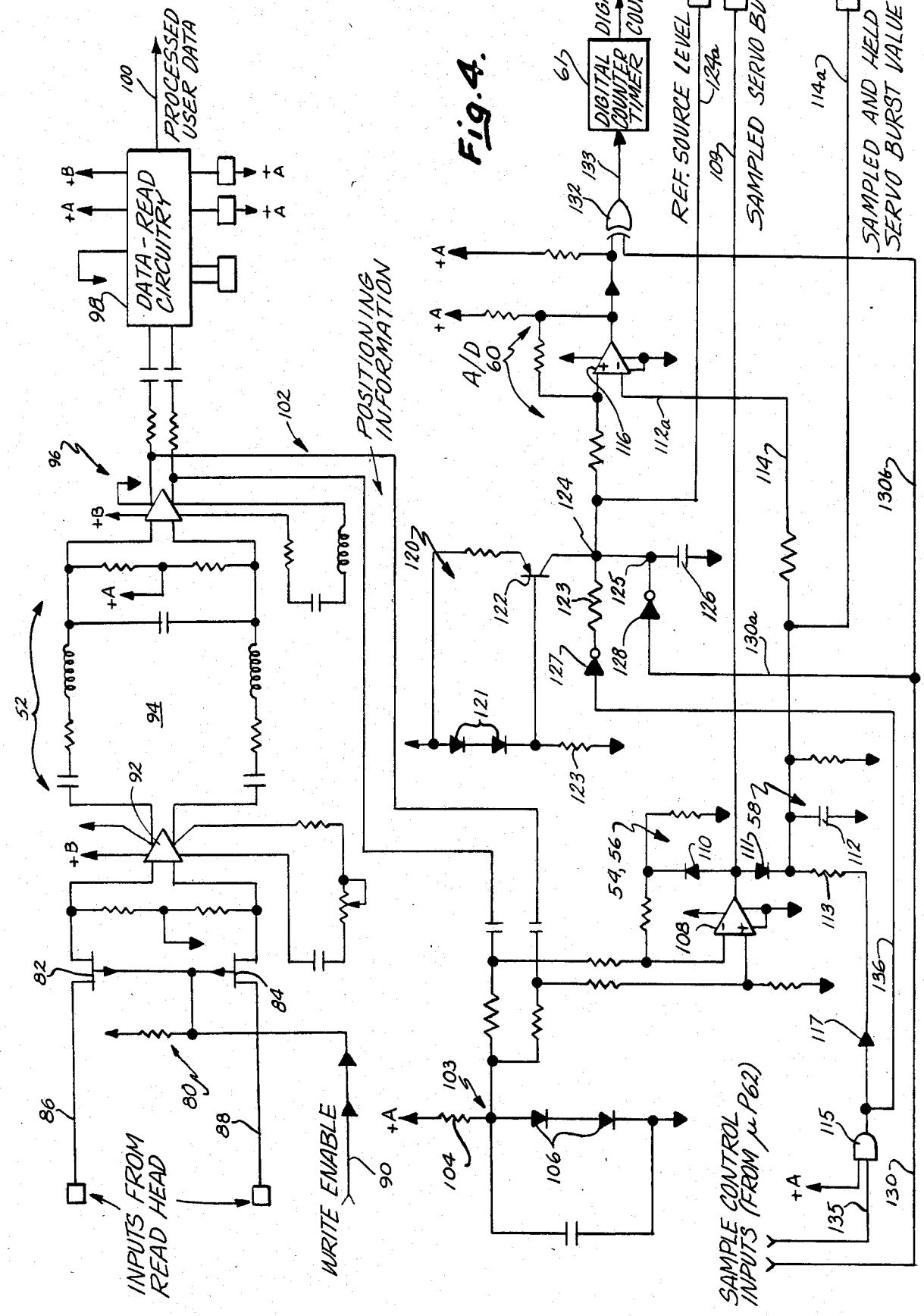

METHOD AND APPARATUS FOR POSITIONING TRANSDUCERS BY DIGITAL CONVERSION OF ANALOG-TYPE SIGNALS

TECHNICAL FIELD

This invention relates broadly to methods and apparatus for obtaining digital expression of various analog-form signals, in particular, signals which are "read" (i.e., transduced) from head-positioning information recorded on storage media, particularly magnetic storage media. More particularly, the method and apparatus of the invention pertain to digital decoding of encoded track-identification signals recorded along each of a multitude of closely-adjacent and narrow recording tracks on such media, as well as digital quantification of tracking or positioning signals (embedded servo signals) recorded along such tracks and used in servo systems to maintain transducer alignment with a particular such track. In a particular such environment, the invention has desirable application to magnetic tape memory systems having pre-recorded track-identification and servo-positioning bursts along the different tracks, but in its more general aspects the invention is applicable to other forms of media and to a variety of identification and positioning signal formats.

BACKGROUND OF THE INVENTION

Analog-to-digital code conversion has in the past been accomplished in a number of different ways, commencing, long ago by use of various discrete-component hardware implementations and proceeding through periodic generations generally trending toward the development and production of integrated circuit devices intended for universal or widely-applicable use as "building block" converters, which have come to be used on a more or less generalized basis, in a multitude of applications, wherever the need presented itself.

The use of such "off the shelf", multi-purpose A/D converters has led to almost immediate acceptance and widespread use which to a considerable extent has replaced particularly-designed hardware converter implementations; however, it is quite likely that in a number of such instances individually-designed converter systems would yield both improved results and economic advantage as well, and the present invention is addressed to situations of this type.

In a particular illustrative embodiment, the present invention is directed to "embedded servo" systems such as (by way of particular example) that disclosed in previously-filed applications for U. S. Patent Ser. No. 280,138, now U.S. Pat. No. 4,472,750, issued Sept. 18, 1984, Ser. No. 589,007, now U.S. Pat. No. 4,586,094, issued Apr. 29, 1986, which are assigned to the same assignee as the present invention. In the systems particularly addressed in these prior applications, a format for embedded servo information is disclosed which includes positioning information blocks containing both track-identification information and servo-positioning tracking "bursts". In a preferred form, the track-identification information comprises a sequential series of timed bursts of constant-amplitude and constant-frequency signals which are formatted to occur in "bit cells", the arrangement being such that a sequence of such bursts comprises a series of individual bit cells, and in each such bit cell the relative duration of the burst is indicative of a binary zero or one in digital value. In this manner, the numerical designation of each recording track on the media may readily be encoded in binary form for subsequent detection and decoding by the transducer head when it is in a position of alignment with respect to that particular track. Further, disposed in a given time relationship with respect to such track-identification bursts, paired servo-tracking signals are recorded, for example by first and second ("A" and "B") bursts which are positioned on opposite sides of the track centerline and which appear in predetermined timed sequence with respect to one another. Such tracking bursts are detected and decoded in an amplitude-representative manner, i.e., with opposite but equal amplitudes in the event the head is precisely centered on the track centerline, and with progressively different relative amplitudes resulting from tracking displacement of the head to one side or the other of the centerline, differencing of the "A" and "B" signal values producing an error signal which can be used in closed-loop servo-controlled tracking procedures.

In an environment such as the one just described, digital processing is an integral part of the overall operation of the system, whose purpose is for the storage and retrieval of user data, typically recorded with very high-density bit streams in a modified FM recording format. It is thus desirable and perhaps essential to use such digital processing techniques (e.g., by microprocessor control) in decoding and utilizing the positioning information, but it does not necessarily follow that the most effective and advantageous systems to be employed for this purpose should utilize "off the shelf" integrated circuit A/D converters, either for the quantification of the A and B servo-positioning bursts, or for the decoding of the track-identification information.

BRIEF SUMMARY OF THE INVENTION

Briefly stated, the method and apparatus of the invention comprises novel A-to-D conversion procedures by which anticipated signal bursts are processed to obtain pulses whose particular width is dictated by the amplitude of the detected or received bursts, and whose particular width is quantified directly by using the magnitude of the pulse to drive a counter-timer. The resulting count thus integrally embodies a digitized representation of the initial analog signal burst, and provides a digital signal which is directly available for further digital processing as for example by storage in memory and comparison or computation through use of digital components or devices.

Considered from a somewhat more particular perspective, the method and apparatus of the invention in a preferred embodiment comprises discrete hardware componentry utilized in conjunction with what may be typical or known types of read channel electronics in a digital storage device, for example magnetic disc or tape, which in effect separately channels the detected positioning signals after differentiation thereof, to subject such signals to timed and comparative sample-and-hold techniques using as a reference a known function generated during an identical period, the reference and the held, sample signal being applied to a bi-stable device (e.g., comparator) whose shifting states trigger a counter-timer and thus produce the afore-mentioned digital count.

As indicated above, the conversion apparatus and method of the invention are most advantageously applicable to embedded servo-tracking systems, and in particular to certain such systems utilized in connection with magnetic tape as a recording media, and with positioning information formats including both track-identification information and servo-positioning information. In such environment, the methodology of the invention provides for use of the same basic digital conversion circuitry and components for use in both decoding track addresses and for comparing the A and B servo-positioning signals and generating an error signal therefrom. In particular, the system produces digital representations of the track addresses and of A and B positioning signal magnitudes, and thus directly provides digital signals from which a normalized error signal may be produced by digital computation techniques.

The method and apparatus of the invention thus provide desirable and effective digital conversion techniques and circuitry by use of discrete hardware components providing multiple-purpose results on a more advantageous cost-effective basis than would be true, for example, by use of typical integrated circuit components. Additional objectives and advantages of the invention will be made more apparent upon consideration of the ensuing specification and by reference to the attached drawings, depicting a particular preferred embodiment of the invention.

BRIEF DESCRIPTION OF THE DRAWINGS

In the drawings:

FIG. 1 is reproduced from the aforementioned co-pending application Ser. No. 280,138, and illustrates a preferred and illustrative format for positioning information, in conjunction with which the method and apparatus of the invention are particularly advantageous and in connection with which the same will be explained;

FIGS. 2a and 2b, are also reproduced from the aforementioned co-pending application, and constitutes an illustrative timing and decoding illustration of an exemplary track-identification format;

FIG. 4 is a schematic circuit diagram illustrating one particular preferred embodiment of the invention.

DESCRIPTION OF THE PREFERRED EMBODIMENTS

Figure 3:
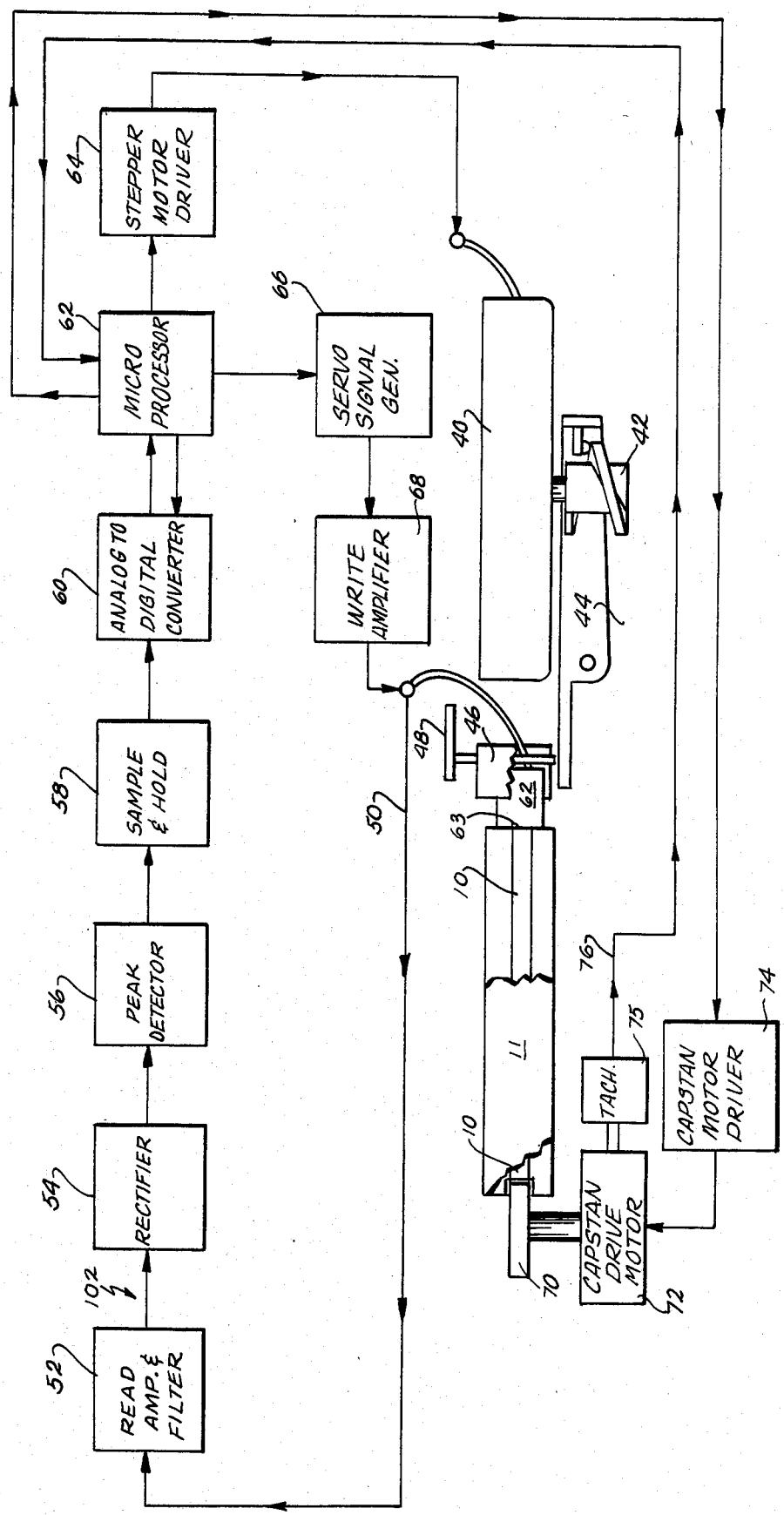
FIG. 3 is a system block diagram showing the general attributes of a preferred read/write system for use in storage apparatus in accordance herewith.

As indicated above, FIGS. 1, 2a, and 2b are reproduced from co-pending and commonly-owned application Ser. No. 280,138, and serve to depict an illustrative, but preferred, embedded servo format and track-identification coding scheme, in connection with which the present invention will be explained.

In FIG. 1, an illustrative segment 10 of recording media is shown, which may be considered to be a segment of recording tape although in a broader aspect being representative of other forms of recording media, e.g., magnetic disc. The segment of media 10 so illustrated is shown to have user-data recording fields 18 and 18' and a number of parallel data tracks or paths, designated I-IV inclusive, it being understood that any given number of such parallel paths or tracks will typically be present on media as customarily used. As illustrated, between the user-data fields 18 and 18' is a block 20 of positioning information, which includes both track-identification headers 32, 32a (track I), 34, 34a (track II), 32', 32'a (track III), etc. In addition to the track-identification headers just noted, each of the blocks of positioning information 20 in each of the recording tracks also includes a pair of laterally-offset servo-positioning bursts 36 and 38, which are disposed sequentially with respect to one another along the length of the recording track and positioned on opposite sides of the track centerline. The aforementioned co-pending application Ser. No. 280,138 sets forth the purposes underlying the format just described, together with the advantages obtained thereby, and it should be observed here that the disclosure in such co-pending application is expressly incorporated herein by reference. For added clarity, and considering the showing set forth in FIG. 1, it may be noted that this Figure is intended to principally illustrate the use of recording tape as a media, with the tracks being recorded in serpentine, alternating fashion, i.e., track I being forwardly-encoded, track II being reversely-encoded, track III being forwardly-encoded, etc. Within each such track, the first-encountered header (e.g., header 32 in track I and header 34a in track II) is forwardly-encoded, whereas the last-encountered headers (e.g., header 32a in track I, header 34 in track II, etc.) are reversely-encoded, so as to present the same recording pattern and timing during read operations, bearing in mind that in the event positioning error occurs it will be important to rapidly identify the particular track encountered.

In the above-described positioning information format, it will be noted that the track-identification headers 32, 34a, etc. are each centered upon their respective recording tracks, whereas the servo-positioning bursts 36, 38, etc. are laterally offset, extending in opposite directions from the track centerline in each case. Accordingly, it will be understood that if a transducer head having a height of approximately one-half track is utilized, the amplitude of the signals reproduced from the track-identification headers will be approximately the same even if the transducer pole pieces ("gap") is misplaced as much as one-half track away from the centerline of a track being followed. Essentially the opposite is true with respect to the amplitude of signals reproduced from the "A" and "B" servo-positioning bursts 36 and 38 (or 36', 38', etc.) since if the transducer head is precisely aligned with the track centerline, each such servo-positioning burst will be reproduced with equal amplitude although being disposed sequentially in time. The further the recording head errs away from the track centerline, however, the higher the amplitude will be for the signals reproduced from the particular servo-positioning burst over which the head is more fully aligned.

It will be noted that in the illustrated embodiment of FIG. 1, each of the data fields 18, 18' in the adjacent tracks terminates at the same point along the tape, on a track-to-track basis, although such lateral registration is not in a strict sense an absolute requirement of the general system illustrated. The depicted arrangement does, however, serve to illustrate that in a forward progression through each of teh serpentine recording tracks, the positioning information format provides a consistent pattern which is the same from one track to another on the basis of content and timing. Consequently, each such block of positioning information may be utilized as a synchronization pattern, and of course identical timing may be used for detection and decoding of the information contained therein. For example, referring to track I as illustrative, it will be noted that an erased gap designated "x" appears between the end of the user-data field 18 and the first (forwardly-encoded) header block 32. A different and longer erased gap (x+y) exits between the end of the oppositely-encoded header 32a and the next ensuing user-data block 18'. The same pattern is true in track II if the same is considered in a right to left direction, and the pattern of track I is repeated in track III, etc. In actuality, the length of gap "y" is the same as the length of one of the track-identifications headers 32, 34, etc., and this distance or duration, is approximately twice that of the servo-positioning bursts 36, 38 (represented in FIG. 1 by the designation "z"). Representing such durations are, for the length "y" of the track-identification headers, a duration of approximately 2 milliseconds, and the duration "z" of the positioning burst on the order of 1 millisecond.

An exemplary track-identification header 32 occurring over a duration y is illustrated in FIG. 2a, and the envelope thereof is illustrated correspondingly in FIG. 2b. It may be seen in this Figure that the overall duration of the track-identification header is divided up into a number of bit cells, six of the same being shown for purposes of illustration in FIG. 2b wherein they are designated as bit cells A-F inclusive. During each such bit cell, a burst of uniform-frequency signal is recorded (for example, square waves at a frequency such as 125 kilohertz). The duration of each of these bursts of uniform frequency (and uniform amplitude) determines whether the logic value of that bit cell is a binary zero or a binary one. More particularly, in accordance herewith, each of the headers 32, 34, etc. occurs at a known timing point within the positioning block, and each such header is in effect subdivided into a known number of bit cells, each of which thus occurs at a known point in time and which may be decoded on the basis of that predetermined timing pattern. More particularly, if each bit cell is considered to be divided into three "sub-cells", the presence of the recorded signal for a duration of (for example) the first one-third of the bit cell may be taken to indicate the presence of a logic zero, whereas the continuing presence of the signal for the first two-thirds of the bit cell may be considered to be a logic one. In such an arrangement, there will typically be no signal present during the last one-third of each bit cell, and indeed the presence of signal during that interval may if desired be deemed an error check. Thus, the signal pattern depicted in FIG. 2a may be seen to represent a properly-encoded signal whose overall logic value would be 001010. Each such bit value may be utilized as part of a track address, or a certain number less than the whole may suffice for that purpose, with remaining bit cell values being taken as an indicator of other desired information, e.g., the relative position of that block along the length of the recording track.

While the detection, decoding, and error-signal generation techniques employed with positioning patterns of the nature of that illustrated at 20 in FIG. 1 may be accomplished in a variety of different ways, certain particular such ways constitute the main focus of the present invention. More particularly, as illustrated in the system block diagram of FIG. 3 (which is reproduced from co-pending application Ser. No. 589,007, directed toward preferred methodology for writing such servo patterns), a preferred overall system for reproducing and processing the positioning information includes a closed-loop head-positioner system comprising a stepper motor 40 whose rotational output drives a positioning cam 42 which is in turn coupled by a pivotal positioning arm 44 to the transducer or head 46, shown as being vertically movable upon a positioning and guiding head slide 48. The transduced "read" output from the head 46 is coupled along a path 50 to a read amplifier and filter 52, and the output of the latter is coupled sequentially to a rectifier 54, a peak detector 56, a sample-and-hold circuit 58, and an analog-to-digital converter 60, whose output ultimately is fed to a microprocessor 62 which controls the stepper motor driver 64, thus controlling the operation of stepper motor 40. The illustrated system also includes, for the sake of completeness, a servo signal "write" generator 66 whose output is coupled through a write amplifier 68 back to the transducer head 46, for recording or "writing" operations. The recording media or tape 10 is shown as being provided in cartridge form, enclosed within a cartridge housing 11, in which it is driven by a motor-driven capstan 70 which may be directly-coupled to a capstan drive motor 72, a motor driver being shown as 74. Inasmuch as accurate tape speed control and regulation is of the essence in such operations, both for "reading" and "writing" on the tape, a tachometer 75 should be utilized, driven by the capstan drive motor 72, the tachometer output being coupled back to the microprocessor 62 along a path 76.

Referring now to the schematic diagram shown in FIG. 4, and considering the same generally in light of the overall system shown more generally in FIG. 3, the read amplifier and filter 52 may generally be considered to be that portion of the circuit shown at the top of FIG. 4. More particularly, this circuitry preferably includes an input switch section 80 comprising the two interconnected FET's 82 and 84, each of which controls (opens or closes) one of the two complementary input lines 86 and 88, both FET's in turn being simultaneously controlled by a write-enable or write-gate signal applied to path 90 during times when information (user data) is being written on the media. Input switch 80 thus provides a read-disable feature during writing operations. Assuming a read mode, the inputs from the transducer head on paths 86 and 88 are coupled through FET's 82 and 84 and are applied to an amplifier 92, which may be a TL 592 differential video amplifier which in effect provides a preamplifying function. Following amplifier 92, the read signals are applied to the filter network 94, which is a 2-pole low-pass, 1-pole high-pass filter. Following filter 94, the signals are applied to a differentiator network 96 and, after differentiation, are applied to a conventional data-read circuit 98, which may be an IC3470 read chip frequently used in such data-read applications. The processed data signals from read chip 98 are outputted on path 100, which may be coupled back to the host data system for any of the customary functions (e.g., display, printing, etc.).

Apart from user-data reading functions, outputted on path 100 as noted above, the read system of FIG. 4 also reproduces signals from the positioning information blocks 20 described above in connection with FIGS. 1 and 2. These read signals are of a very different nature than the user data signals, as already noted, and after passing through the input switch 80, preamp 92, filter 94, and differentiator 96, these signals are coupled along path 102 for decoding and digital conversion, which involves the rectifier stage 54, peak detector stage 56, sample-and-hold stage 58, and ultimately the A-to-D section 60, the components of which are illustrated in the lower portion of FIG. 4.

With continued reference to the latter, it will be noted that path 102 initially encounters a voltage level-setting and rectifying network 103 which is coupled to the "A+" voltage supply through an appropriate resistor 104 and which has a pair of series-connected diodes 106 used to bias the input of an operational amplifier 108. The resulting signals are then coupled to the half-wave rectifier and peak detector network 56, which preferably includes back-to-back diodes 110 and 111 which reject any signal component below a set level and pass only the selected (i.e., "sampled") positive peaks (half-wave rectification) of the differentiated positioning signal to a storage capacitor 112. The latter provides the "hold" function, under control of a "threshold" signal applied via input line 135 to an AND gate 115 and an inverter 117, by means of which the storage capacitor 112 may be cleared or discharged (i.e., "dumped") at selected times. The sampled, peak-detected, differentiated signal is then coupled along path 114 and applied to the negative input of a comparator 116. Also, this signal is outputted along a parallel path 114(a) for test or other purposes, as noted hereinafter.

Comparator 116 has its positive input coupled to a constant-current charging network 120, which includes a transistor 122 whose base is coupled to the "B+" supply through a pair of series-connected diodes 121 and a voltage-developing resistor 123. The common node 124 of the comparator 116 and the constant-current source 120 is coupled to one side of a storage capacitor 126, which is selected to produce a reverse sawtooth wave shape in response to applied cycles of the constant-current charging circuit. The node or point 124 is also coupled to input line 135 and control gate 115, along path 136, through a resistor 123 and an inverter 127, Nodal point 124 is, additionally, coupled from point 125 through an inverter 128 back along line 130(a) to a "clear" or "dump" input line 130, which in general parallels the threshold input line 136 noted above. Both input lines 130 and 135 are coupled to outputs of the microprocessor 62 (FIG. 3) to receive control signals therefrom. Path 130 is also coupled, along a second branch 130(b), to one input of an "Exclusive OR" gate 132, whose other input is coupled back to the output of comparator 116, while also being connected to the "A" supply source.

Generally speaking, the overall functioning of the circuitry just described above is to provide a very accurately-timed switched output from the Exclusive OR gate 132 on line 133, which is coupled to a digital counter-timer 61 (for example, and IC8253) which may be considered as part of the "analog-to-digital converter" block 60 shown in FIG. 3. As explained more fully below, the result is a digital count value provided to the microprocessor. When utilized to process the track-address headers 32, these count values signify the presence of at least minimum-amplitude signal bursts within the various bit cells and also time the duration thereof, so as to indicate whether the same constitute logic zeros or logic ones. When dealing with the read output produced from reproduction of the A and B servo bursts 36 and 38, respectively, the count values directly indicate the amplitude of the tracking signals read, on the basis of which an error signal may readily be computed by the microprocessor for use in making tracking corrections.

More particularly, the overall operation briefly described above is achieved by applying the rectified and peak-detected ("sampled") positioning information "read" signal to capacitor 112, which stores ("holds") the resultant value while that value is applied to one input of comparator 116. The other input of this comparator is coupled to charging capacitor 126, which produces a linear ramp function as a result of being charged by constant-current source 120. If the positive input of the comparator is higher than the negative input, the output to gate 132 remains high, but whenever the opposite input condition prevails, the output goes low. Which of these two input conditions prevails is thus primarily a function of the amplitude of the signal stored on capacitor 112, which reflects the amplitude of the read signal from the transducer. Accordingly, considering the A and B servo-positioning bursts (36 and 38 in FIG. 1), with appropriate internally-clocked sampling control signals from the microprocessor applied on inputs 130 and 135, each such A or B servo burst is sampled by clearing or dumping the storage capacitors 112 and 126 and then allowing the same to charge in response to their respective applied signals. As described above, the charge applied to capacitor 126 generates a linear ramp function whose magnitude is compared by comparator 116 to the magnitude of the "A" or "B" servo-positioning signal then being held on capacitor 112. Whenever the latter value is exceeded by the linearly-rising charge on capacitor 126, comparator 116 will toggle, or change state. The "dump" signal from the microprocessor on input 130 which initially clears storage capacitor 126 via line 130(a) is also applied by line 130(b) as an iput to Exclusive OR gate 132; consequently, this input will normally remain high, as is also true of the output of comparator 116 prior to the time it toggles in the aforementioned manner. Thus, toggling of comparator 116 causes a change of state by Exclusive OR gate 132, and this produces a switched output state on path 133, which is used as one of the controls for the aforementioned counter-timer 61. When the sampling-storage capacitor 112 is discharged (through resistor 113) by a control signal (logic low) applied to input 135, the resulting logic low signal is also coupled along path 136 to node 124 and to the positive input of comparator 116, thereby toggling the latter and changing the state of Exclusive OR gate 132, which resets the counter-timer 61. As soon as charge from the next sampled servo signal has been accumulated on storage capacitor 112, the counter-timer begins running again, and whenever the steadily-rising ramp applied to capacitor 126 causes toggling of the comparator 116, the changed-state output of the comparator, under logical control of gate 132, will again stop the counter from running.

The operation just described produces a digital count value in counter 61 which is directly proportional to the amplitude of the sampled servo signal held on capacitor 112. This count thus provides a pulse signal whose width accurately measures the "A" servo amplitude, and a similarly-produced such signal immediately follows which measures the amplitude of the corresponding "B" servo signal. These two digital count values, coupled to microprocessor 62 from counter-timer 61, can readily be differenced to produce an error signal, and in fact the two such digital values can readily be utilized by the microprocessor to produce a normalized error signal, through application of the classical normalization relationship constituting the difference-sum quotient of the A and B values.

The same basic type of operation provides a convenient and accurate way of decode the track address information encoded in positioning blocks 32, 34, etc. .

.. This is accomplished by the processor 82 setting input control line 135 low and in turn causing the output of inverter 117 to also go low. This results in capacitor 112 being discharged through resistor 113. When track address signals (as shown in FIG. 2b) are present, a semi-sawtooth signal is present on capacitor 112, with some nominal DC value. In the absence of signal (such as during the last third of each bit cell, after a burst defining a logic one or zero) the signal stored on capacitor 112 will decay to a nominal zero (volt) level. In addition to the operation just stated, branch 136 of control line 135 also causes inverter 127 to go low, resulting in the constant-current source 120 providing current through resistor 123 and establishing a preselected level at node 124. This level at node 124 is compared by comparator 116 to the semi-sawtooth signal on capacitor 112. In the presence of a track address signal within the bit cell, the minimum value on capacitor 112 is greater than the value at node 124. When the track address signal stops, at some fixed time later, the value on capacitor 112 will drop below the level at nodal point 124. This in turn causes comparator 116 to change state, indicating the absence of signal. The time counted from the first detected presence of the track address signal until the detected absence is used to accurately determine the logic value of the bit cell signal, i.e., a binary "one" or "zero".

Thus, by successively accumulating on capacitor 112 the charge attributable to the signal which is present in each of the bit cells shown in FIG. 2, and by timing the duration of each such signal the encoded signals within each of the different bit cells may first be qualified with respect to satisfying a required minimum threshold value and then decoded as to logic zero or one value according to the length of time which counter-timer 61 shows each threshold-qualified signal to have been present during the bit cell. During this operation, "dumping" of the storage capacitors for reset purposes is under microprocessor control on a time-gating ("windowing") basis corresponding to the known positioning signal location and the known bit cell timing and duration. By sequentially storing each resulting count for a bit cell grouping, the corresponding digital address or value is assembled for the track then being followed and read.

From the foregoing description and discussion, it may be seen that the present invention provides a unique method and apparatus for A–D conversion, particularly (but not exclusively) useful in data-storage devices such as disc and tape drives, having different controllable modes of operation by which recording track address bursts are directly decodable and may first be tested or qualified against a predetermined minimum allowable recording amplitude, and also by which servo-positioning (tracking) bursts recorded along the data tracks on the media may be directly decoded, compared and used to produce a position-corrective error signal. In the second such mode, the method and apparatus produces precisely-timed pulses whose width is directly proportional to the amplitude of the recorded signals read from the media, the count values so produced thus digitizing the same. In the first such mode, where amplitude values (beyond merely meeting minimum threshold levels) may not be representative of information, the duration of the signals may be outputted in similar direct digital form but with the resulting digital count value representative of the duration of the transduced signal. At the same time, valuable economies are realized since although implemented from discrete circuit components rather than being of integrated-circuit form, the preferred apparatus may be constructed at approximately one-third the cost of typical integrated circuit (chip)-form A–D converters adapted for similar operational results.

It is to be understood that the above is merely a description of a preferred embodiment of the invention and that various changes, alterations and variations may be made without departing from the underlying concepts and broader aspects of the invention as set forth in the appended claims, which are to be interpreted in accordance with the established principles of patent law, including the doctrine of equivalents.

The embodiments of the invention in which an exclusive property or privilege is claimed are defined as follows:

1. A method of decoding transducer head-positioning information recorded on storage media and positioning a transducer head in accordance therewith, comprising the steps of: reading the recorded information and producing corresponding signals for decoding; sampling representations of such signals at predetermined times, and at least temporarily holding a value representative of the magnitude of the sampled signal representations; timing an interval during which a reference source increases at a known rate from a first value to a second value whose difference corresponds to said magnitude of said sampled signal representations; outputting said timed interval in the form of a digital count value, said count value corresponding to and being a digital representation of the magnitude of the stored information which has been read and sampled; and positioning said transducer head by moving the same an amount based at least partially upon said outputted digital value.

2. The method as recited in claim 1, including the step of peak-detecting representations of said corresponding signals as part of said sampling step.

3. The method as recited in claim 2, including the step of differentiating said corresponding signals prior to said peak-detecting step.

4. The method as recited in claim 1, including the step of cumulatively summing and storing the output from a substantially constant supply and using the magnitude of the cumulative store as said reference source.

5. The method as recited in claim 1, including the step of timing said interval by starting a digital counter device at the said first value of the reference source and stopping said device at said second value of said source.

6. The method as recited in claim 1, including the steps of determining a representation of the amplitude of said corresponding signals produced from the recorded information, and comparing the amplitude representation so determined with a predetermined standard representing a minimum allowable amplitude, to thereby establish a required minimum amplitude threshold for the corresponding signals.

7. The method as recited in claim 1, including the steps of reading said recorded information at different points on said media and producing corresponding first and second signals which are respectively representative of first and second servo-positioning indicia recorded on said media; separately sampling and holding representations of said first and second signals, and separately timing intervals during which said reference source increases from a first value to a second value for each such held signal representation; outputting each of the timed intervals so produced in the form of different ones of said digital count values; and using said outputted digital values in positioning said transducer head by obtaining a representation of the difference between said different digital count values and using said difference as a basis for moving the head.

8. The method as recited in claim 1, including the steps of sequentially and repetitively sampling a series of said corresponding signals during adjacent time windows of predetermined duration; timing the interval during which such signals are present within each such time window, and producing a digital count value which is representative of such timed interval; comparing each such produced count value with a predetermined count value which defines different logic states, to thereby determine a particular logic state for each such produced count value which is representative of the signal presence within each such time window; assembling a plurality of the successive logic states so determined to form a digital term representative of the collective positioning information recorded on said media at the location proximate said transducer head when the information was read out thereby; and said step of positioning said transducer head including determining present head position relative to the media by us of said digital term.

9. The method as recited in claim 8, including the steps of peak-detecting representations of said corresponding signals as part of said sampling step.

10. The method as recited in claim 9, including the steps of determining a representation of the amplitude of said corresponding signals produced from the recorded information, and comparing the amplitude representation so determined with a predetermined standard representing a minimum allowable amplitude, to thereby establish a required minimum amplitude threshold for the corresponding signals.

11. The method as recited in claim 10, wherein said steps of timing the interval during which such signals are present within each such time window are carried out by timing the duration between the initial presence and next ensuing absence of said required minimum amplitude for said corresponding signals during said time windows.

12. A method of decoding transducer head-positioning information recorded on storage media and positioning a transducer head in accordance therewith, comprising the steps of: reading the recorded information and producing corresponding signals for decoding; sequentially and repetitively sampling a series of said corresponding signals during adjacent time windows of predetermined duration; timing the interval during which such signals are present within each such time window, and producing a digital count value which is representative of such timed interval; comparing each such produced count value with a predetermined count value which defines different logic states, to thereby determine a particular logic state for each such produced count value which is representative of the signal presence within each such time window; assembling a plurality of the successive logic states so determined to form a digital term representative of the collective positioning information recorded on said media at the location proximate said transducer head when the information was read out thereby; said step of positioning said transducer head including determining present head position relative to the media by use of said digital term.

13. The method as recited in claim 12, including the steps of peak-detecting representations of said corresponding signals as part of said sampling step.

14. The method as recited in claim 13, including the steps of determining a representation of the amplitude of said corresponding signals produced from the recorded information, and comparing the amplitude representation so determined with a predetermined standard representing a minimum allowable amplitude, to thereby establish a required minimum amplitude threshold for the corresponding signals.

15. The method as recited in claim 14, wherein said steps of timing the interval during which such signals are present within each such time window are carried out by timing the duration between the initial presence and next ensuing absence of said minimum allowable amplitude for said corresponding signals during said time windows.

16. Apparatus for decoding transducer head-positioning information recorded on storage media and positioning a transducer head in accordance therewith, comprising means for reading the recorded information and producing corresponding signals for decoding; means for sampling representations of such signals at predetermined times, and at least temporarily holding a value representative of the magnitude of the sampled signal represenations; mans for timing an interval during which a reference source increases at a known rate from a first value to a second value whose difference corresponds to said magnitude of said sampled signal representations; means for outputting said timed interval in the form of a digital count value, said count value corresponding to and being a digital representation of the magnitude of the stored information which has been read and sampled; and means for positioning said transducer head by moving the same an amount based at least partially upon said outputted digital value, said apparatus, further comprising a first capacitor-charging network for storing said sampled representations of read signals and a linearly-rising voltage source for said reference source.

17. Apparatus according to claim 16, and including a bi-stable switching means for receiving a representation of the signal level stored on said capacitor-charging network as one input, for receiving a representation of said linearly-rising reference souce as another input and for changing its output state in response to the presence of predetermined amplitude relationships between said inputs.

18. Apparatus according to claim 17, and including a counter means for receiving said output of said bi-stable switching means and for providing a count value representative of the output state of said switching means.

19. Apparatus according to claim 18, wherein said counter means is arranged to provide a count value representative of the period during which said linearly-rising reference source rises to said predetermined amplitude relationship with the charge stored on said capacitor-charging network.

20. Apparatus according to claim 18, wherein said counter means is arranged to provide a count value representative of the amplitude of the charge stored on said capacitor-charging network.

21. Apparatus for decoding transducer head-positioning information recorded on storage media and for positioning said head in accordance with the decoded information, comprising in combination: a read head and read circuitry means coupled thereto, for producing signals corresponding to information recorded on said media and read by said head; sample-and-hold circuit means for receiving said signals and storing values representative of the recorded information read by said read head; counter means for producing an output count representative of the said values stored by said sample-and-hold circuit means; and servo-positioner means for receiving said output count and effecting changes in the position of said read head in relation to the value of said count.

22. The apparatus of claim 21, wherein said counter means includes a digital counter component and control means coupled to said counter for starting and stopping its count operation in relation to said stored values.

23. Apparatus for decoding positioning information recorded upon storage media, comprising: means for reproducing said recorded information by providing signals representative thereof; means for sampling the magnitude of said representative signals at predetermined times when at least recording-track identification information or recording track-following information is expected to be reproduced; means for storing the samples of signals produced by said means for sampling; and means for producing a count value having a known proportionality to the signals sampled and stored, said count value thereby comprising an encoded representation of at least one of said recorded track-identification or track-following information.

24. The apparatus of claim 23, including means for sampling said signals representative of said recorded information at predetermined first times when recording track-identification information is expected to have been reproduced and at predetermined second times when recording track-following information is expected to have been reproduced; and including means for producing first and second count values, said first count values having predetermined proportionality to the signals sampled at said first times and said second count values having predetermined proportionality to the signals sampled at said second times, said first and second count values comprising encoded representations of said track-identification information and of said track-following information, respectively.

25. The apparatus of claim 24, including means for storing the samples of signals produced by said means for sampling, at both said first and said second times, and including means for producing first and second digital counts based upon the respective stored samples, said first and second digital counts comprising encoded representations of said track-identification information and of said track-following information, respectively.

26. The apparatus of claim 25, including means for timing intervals during which a reference source increases at a known rate from a first value to a second value whose difference corresponds to said magnitude of said sampled signal representations and for producing timing counts corresponding to said timed intervals, said timing counts comprising encoded representations of said track-identification information and of said track-following information, respectively.

27. The apparatus of claim 26, including means for cumulatively summing and storing the output from a substantially constant supply and using the cumulative store as said reference source.

28. The apparatus of claim 24, including means for timing an interval during which a reference source increases at a known rate from a first value to a second value whose difference corresponds to said magnitude of said sampled signal representations.

29. The apparatus of claim 28, including means for cumulatively summing and storing the output from a substantially constant supply and using the cumulative store as said reference source.

* * * * *

UNITED STATES PATENT AND TRADEMARK OFFICE
CERTIFICATE OF CORRECTION

PATENT NO. : 4,646,175
DATED : February 24, 1987
INVENTOR(S) : Edmund L. Sokolik et al.

It is certified that error appears in the above-identified patent and that said Letters Patent is hereby corrected as shown below:

Column 4, line 58;

"teh" should be --the--.

Column 8, line 29;

"iput" should be --input--.

Column 12, Claim 16, line 27;

"represenations; mans" should be

--representations; means--.

Signed and Sealed this

Eighth Day of September, 1987

Attest:

DONALD J. QUIGG

Attesting Officer

Commissioner of Patents and Trademarks